Nov. 4, 1952
P. LINDNER ET AL
2,616,466
MACHINE FOR HUSKING CEREAL GRAINS
Filed June 1, 1949
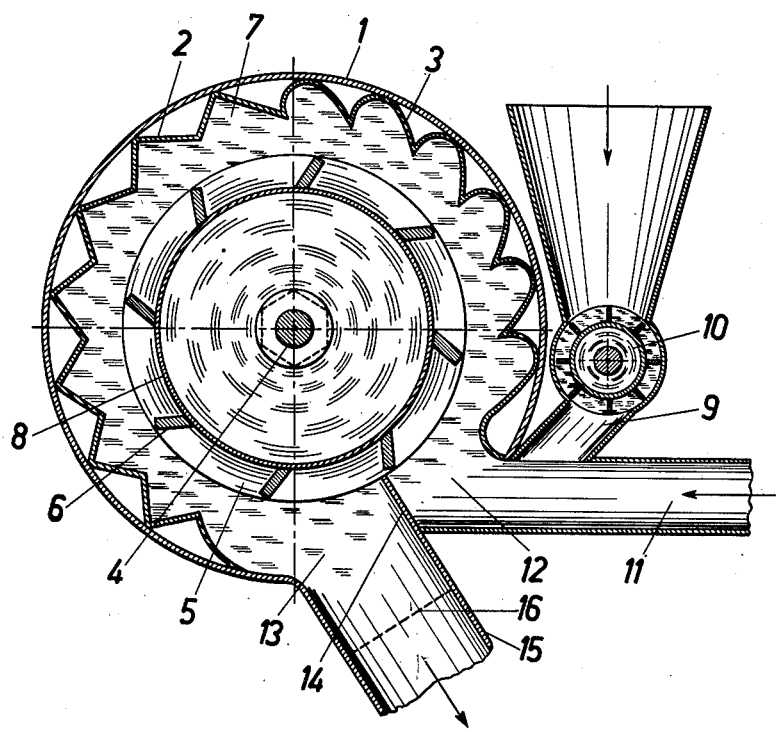
INVENTORS
Paul Lindner
Johann Hoffmann,
BY
ATTORNEY Patented Nov. 4, 1952

2,616,466

UNITED STATES PATENT OFFICE 2,616,466

MACHINE FOR HUSKING CEREAL GRAINS

Paul Lindner and Johann Hoffmann,
Vienna, Austria

Application June 1, 1949, Serial No. 96,464
In Austria June 7, 1948

2 Claims. (Cl. 146—253)

This invention refers to a machine for husking cereal grains, in particular oats, in a suitable manner avoiding any breaking of the berry.

An important pre-requisite for obtaining undamaged grain is the correct conditioning of the cereal to be treated, which depends entirely on the type of grain.

In known machines for husking cereal grains, in particular oats, by beating in mills or drums of centrifugal type, the results have hitherto been unsatisfactory. In all cases, some of the grain to be treated penetrates between the beater arms, is carried around by them, and is not exposed to the beating action; it either leaves the machine unhusked, or is superfluously and repeatedly exposed to the action of the beaters, whereby the grains become damaged. In such machines it is not found possible to discharge the grain at the right instant, i. e. as soon as it has been milled sufficiently to lose its husk, without at the same time damaging or breaking the grains.

A husking machine in accordance with the present invention, which works also on the principle of the disintegrator or centrifugal mill, differs in essential features from the known husking machines and is free from the above mentioned disadvantages.

The husking machine of the invention comprises essentially a cylindrical casing, the inner, curved surface of which is provided with a continuous system of baffles, except at the point where an opening is left for the discharge of the husked grain, working in conjunction with revolving beater arms. Compressed air is introduced into the working space, preferably through the feed opening for the grain and simultaneously with the latter, while at the opposite end in the direction of rotation, i. e. at the discharge opening, there is a deflector plate or equivalent means extending over the whole width of the beater arms for the purpose of compelling the husked grain, together with the compressed air, to be discharged.

The husking of the grain is effected under increased air pressure. Ordinarily any increase in the output or acceleration in the progress of the material through a husking machine is accompanied by a greater impact velocity and a consequent increase in the force of impact with the result that the higher output involves a greater amount of damage or breaking of the grains. However, the air cushion formed inside the casing of the machine of the present invention, due to the system of baffles, prevents excessively powerful impact of the grains, and facilitates quick passage of the material through the machine under the increased air pressure without appreciable damage or breaking of the grains, thus substantially increasing the output.

Said air cushion can be controlled either by varying the pressure of the introduced compressed air, or by varying the cross-sectional area of the discharge opening.

The compressed air blown into the working space can be used to feed the material into the machine and thus afford a controlled intake having the advantage that the current of air conveys the grain uniformly through the machine while avoiding excessive rebounding impact of the grains on the baffle plates.

The introduction of the material to be husked, and consequently of the compressed air, is most suitably effected tangentially over the whole width of the beater arms, and a similar arrangement is convenient at the outlet opening.

The number of baffles and beaters, and their reciprocal position and spacing, can be varied at will, and is determined by the nature of the material to be treated. The baffles can be arranged in a ring, in a plane perpendicular to the axis of rotation, or helically, in which latter case their number may be increased at will in order to obtain the most suitable number of impacts of the material, and to ensure complete removal of the husks without damaging or breaking the grains.

Preferably the beaters are carried on a drum which can either be connected with the casing and be stationary, or made to rotate with the beater ring. This drum forms the inner boundary of the working space and prevents the material from becoming carried between the beater arms and consequently leaving the mill without being husked. The drum also prevents the compressed air from becoming deflected into a shorter path.

The accompanying drawing is a diagrammatic sectional elevation of one arrangement in accordance with the invention.

Referring to the drawing, 1 denotes a laterally-closed, as well as at its sides, cylindrical housing or casing provided along its curved inner surface with baffles, which can be either straight as at 2, or curved as at 3. A revolving shaft 4 carries a disc 5 at each side within the sides of casing 1, on which are fixed beater arms 6 between discs 5 which, when the shaft is rotated, work in conjunction with the baffles 2 or 3. The husking chamber or working space is closed on the inside by a drum 8 extending along the length of the cylindrical casing 1 and arranged in the example shown, to revolve together with the discs 5 carrying the beater arms 6. Thus, the beater arms 6 extend from the periphery of the drum 8 with their ends at discs 5 within the peripheral edges or rims of the latter and into the circular or annular husking chamber or working space between said casing 1 and drum 8. The material to be husked is introduced through a feed duct 9, controlled by a distributor 10. Compressed air is supplied through a pipe 11 which unites with the feed duct 9 immediately in front of the entry to the working space, the material to be husked and the compressed air entering said space tangentially obverse to the direction of rotation and movement of the air but deflected therefrom tangentially in the same direction as will be later described, through an intake opening 12 extending over the whole width of the beater arms 6. Discharge of the husked grain together with the compressed air is effected through an outlet opening 13 by means of a radial deflector plate 14 fitted at the inner end of the outlet opening. A discharge duct 15 with which plate 14 may be formed, and associated with the outlet opening 13 is shown provided with a closing or throttling arrangement 16 which enables the outlet cross-section to be varied and the discharge of the compressed air to be controlled or throttled.

The material to be husked, carried by the compressed air into the opening 12, is conveyed in a single operation through the working space or husking chamber 7 in which, cushioned by the accompanying compressed air, it is thrown by the beaters 6 against the baffles 2 or 3 and by the latter back against the beaters, and finally caused to leave the working space by the action of the deflector plate 14, after having been reliably husked and while remaining sound in grain.

We claim:

1. A husking machine comprising an air-tight cylindrical housing disposed with its axis in substantially horizontal position, a series of baffles on the inner curved surface of said housing, beaters revolvably mounted within the housing in spaced relation to said baffles to define therebetween a working space for the material to be husked, an inlet duct opening into the housing, a discharge duct opening from said housing and spaced from the said inlet duct, said inlet and discharge ducts being disposed at the bottom of said housing, a partition in said housing between said ducts and spanning said working space, and a feed duct and an air pressure duct respectively in communication with said inlet duct for supplying air under pressure with the material to be husked to convey the material into the housing and create an air cushion in said working space.

2. A husking machine comprising an air-tight cylindrical housing disposed with its axis in substantially horizontal position, a series of baffles on the inner curved surface of said housing, beaters revolvably mounted within the housing in spaced relation to said baffles to define therebetween a working space for the material to be husked, an inlet duct opening into the housing, a discharge duct opening from said housing and spaced from the said inlet duct, said inlet and discharge ducts being disposed at the bottom of said housing, a radial partition in said housing between said ducts and spanning said working space, a feed duct and an air pressure duct respectively in communication with said inlet duct for supplying air under pressure with the material to be husked to convey the material into said housing and create an air cushion in said air space, and throttling means in the discharge duct to restrict escape of the air under pressure to regulate the density of the air cushion in the working space and enable the outlet cross-section to be varied and the discharge of the compressed air and grain to be controlled.

PAUL LINDNER.
JOHANN HOFFMANN.

REFERENCES CITED

The following references are of record in the file of this patent:

UNITED STATES PATENTS

| Number | Name | Date |
|---|---|---|
| 3,207 | Brown | Aug. 4, 1843 |
| 4,944 | Heygel | Jan. 26, 1847 |
| 36,784 | Jones | Oct. 28, 1862 |
| 143,331 | Clifford | Sept. 30, 1873 |
| 247,232 | Whitman | Sept. 20, 1881 |
| 288,669 | Schwarzwaelder | Nov. 20, 1883 |
| 295,856 | Chichester | Mar. 25, 1884 |
| 303,756 | Scott | Aug. 19, 1884 |
| 487,723 | Titus | Jan. 10, 1893 |
| 579,862 | Danvin et al. | Mar. 30, 1897 |